United States Patent
Ryu

(10) Patent No.: US 6,383,961 B1
(45) Date of Patent: May 7, 2002

(54) COMPOSITION OF DIELECTRIC FOR PLASMA DISPLAY PANEL

(75) Inventor: Byung-Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/572,777

(22) Filed: May 17, 2000

(30) Foreign Application Priority Data

May 18, 1999 (KR) .............................................. 99/17903

(51) Int. Cl.[7] .............................. C03C 3/16; C03C 3/17; C03C 14/00
(52) U.S. Cl. ............................. 501/32; 501/17; 501/18; 501/22; 501/24; 501/26; 501/45; 501/48
(58) Field of Search ............................... 501/17, 18, 22, 501/24, 26, 23, 32, 45, 48, 46; 428/688, 689, 701, 702

(56) References Cited

U.S. PATENT DOCUMENTS 3,885,974 A * 5/1975 Asahara et al. ............... 501/17
4,060,422 A * 11/1977 Asahara ........................ 501/17
4,940,677 A * 7/1990 Beall et al. .................... 501/45
5,526,369 A * 6/1996 Hayden et al. ............... 501/48
5,849,649 A * 12/1998 Poole ........................... 501/26
6,194,333 B1 * 2/2001 Ryu ............................... 501/32

FOREIGN PATENT DOCUMENTS

GB         1369240        * 10/1974

* cited by examiner

Primary Examiner—Michael Marcheschi
(74) Attorney, Agent, or Firm—Fleshner & Kim, LLP

(57) ABSTRACT

A composition of a dielectric for a plasma display panel in user for fabricating a dielectric thick film for a front substrate having a low sintering temperature, a low thermal expensive coefficient, a high dielectric constant and a high withstand voltage. The composition of a dielectric is a $P_2O_5$—ZnO—PbO glass having composition ratios of 30~60 wt % of $P_2O_5$, 5~40 wt % of PbO, 0~5 wt % of MgO, 0~5 wt % of CaO, 0~10 wt % of $La_2O_3$, 0~5 wt % of SrO, 1~5 wt % of $Al_2O_3$, 0~2 wt % of $Sb_2O_3$, 0~2 wt % of $As_2O_3$, 5~25 wt % of BaO, and 0~5 wt % of $TeO_2$.

5 Claims, 1 Drawing Sheet

COMPOSITION OF DIELECTRIC FOR PLASMA DISPLAY PANEL

BACKGROUND OF THE INVENTION

1. Field of the Invention

The present invention relates to a composition of a dielectric for a plasma display panel, and more particularly, to a composition of a dielectric applied to a dielectric thick film coated at the upper surface of a transparent electrode of a front substrate (a substrate on which characters or picture is displayed) of a plasma display panel.

2. Description of the Background Art

Recently, a research and development for flat panel display apparatuses such as a liquid crystal display (LCD), a field emission display(FED) or a plasma display panel(PDP) is actively being conducted. Especially, the PDP is the most remarkable owing to its advantages in that it is easily produced due to its simple structure, a memory function, and a wide view angle more than 160° is attained, and a large screen more than 40 inches can be implemented.

FIG. 1 is a schematic view showing a structure of a plasma display panel in accordance with a conventional art.

As shown in the drawing, the conventional plasma display panel includes a rear substrate 10 on which address electrodes 11 are mounted, a rear dielectric thick film 12 coated with a predetermined thickness on the upper portion of the rear substrate 10 for charging a wall charge, barrier ribs 13 formed on the upper portion of the rear dielectric thick film 12, separating discharge cells 30; a fluorescent material 14 excited by a light generated in plasma discharging, a front substrate 20, a counterpart of the rear substrate, for displaying a picture or characters, a transparent electrode 21 formed at the lower surface of the front substrate 20, a front dielectric thick film 22 coated with a predetermined thickness, for charging the wall charge; and a protective film 23 coated at the upper portion of the front dielectric thick film 22, for protecting the front dielectric thick film 22 from sputtering caused by discharging.

When a predetermined driving voltage (i.e., 200 V) is applied to the address electrode 11 and to the transparent electrode 21, a plasma discharge is generated due to the electrons discharged from the address electrode 11 in the discharge cells.

In detail, as the electrons discharged from the electrode collides with atom of a mixture of gases of He and Xe or of a mixture of gases of Ne and Xe sealed in the discharge cells, the atoms of the mixture of gases are ionized, so that the second electrons are discharged. At this time, the second electrons collide repeatedly with the atoms of the mixture of gases, sequentially ionizing the atoms of the mixture of gases. That is, it goes to avalanche process in which the electrons and ions are increased double. The light generated in the avalanche process emits fluorescent material of a red color (referred to as 'R' hereinafter), a green color (referred to as 'G' hereinafter) and a blue color (referred to as 'B' hereinafter). The light of R, G and B emitted from the fluorescent material proceeds by way of the protective film, the front dielectric thick film and the transparent electrode to the front substrate 20, thereby displaying characters or graphics.

In this respect, the front dielectric thick film 22 coated on the front substrate 20 needs to transmit the light generated from the fluorescent material. Thus, it requires a property of a high transmissivity. In addition, in order to lower the discharge voltage, it requires a property of a high dielectric constant. Besides, the front dielectric thick film 22 necessarily has characteristics of a low thermal expensive coefficient, thermal stability, a low sintering temperature and a fine organization, and an excellent matching between the electrode material and the protective film.

In order to meet the requirement, the principle ingredient of the composition for fabricating the front dielectric thick film of the conventional art is a $PbO$—$B_2O_3$—$SiO_2$ glass, and its specific composition ratio is as follows. That is, on the assumption that the weight of the $PbO$—$B_2O_3$—$SiO_2$ glass is 100 wt %, its composition ratios are 50–85 wt % of $PbO$, 10–20 wt % of $SiO_2$, 10–20 wt % of $B_2O_3$, 0–10 wt % of $K_2O$, 0–10 wt % of $Na_2O$.

A method for fabricating a dielectric thick film comprised of the composition of a dielectric having the above composition ratio will now be described.

First, the $PbO$—$B_2O_3$—$SiO_2$ glass mixed with the above-described composition ratio is made to a fine powder below 10 $\mu$m. Subsequently, the fine powder is mixed with a organic solvent to make a paste or a slurry, which is then coated on the glass substrate (front substrate of the PDP) with a thickness of 20~30 $\mu$m. Finally, after the paste or the slurry coated on the glass substrate is dried for 15~20 minutes at the temperature of 300~350° C., it is sintered at the temperature of 580~590° C., thereby obtaining a transparent dielectric thick film. Such dielectric thick film having the above composition ratio in accordance with the conventional art has the following characteristics.

Namely, the light transmissivity (%), the most critical characteristic of the dielectric thick film for the front substrate, is approximately 75–85% on the basis of a 400~800 nm visible ray, its dielectric constant is 12~14, its thermal expensive coefficient is 65~90×10$^{-7}$/° C., and its withstand voltage is more than 1.5V In detail, since the dielectric constant is relatively low, the plasma discharge voltage is increased. And, since radio of the PbO is so high that the plasma display device weighs heavy. Also, due to the high content of PbO, its light transmissivity is low, and thus, the light emitting efficiency of the plasma display panel is low. Moreover, its fabricating process causes a problem of an environmental pollution. In addition, due to the high sintering temperature, the glass substrate (the front substrate of the plasma display panel) is easily deformed and damaged during a certain process.

Generally, the material for the dielectric thick film to be formed on the upper surface of the rear substrate should have characteristics of a low dielectric constant, a high reflectivity, a low sintering temperature, while the material for the dielectric thick film to be formed on the front substrate should have characteristics of a high dielectric constant, a high light transmissivity and a low sintering temperature.

Accordingly, it is required to develop a material that would satisfy the characteristics of the dielectric thick film for the front substrate of the plasma display panel.

SUMMARY OF THE INVENTION

Therefore, an object of the present invention is to provide a composition of a dielectric for a plasma display panel in user for fabricating a dielectric thick film for a front substrate having a low sintering temperature, a low thermal expensive coefficient, a high dielectric constant and a high withstand voltage.

To achieve these and other advantages and in accordance with the purposed of the present invention, as embodied and broadly described herein, there is provided a composition of a dielectric for a plasma display panel using a $P_2O_5$—ZnO—PbO glass.

In order to achieve the above objects, there is also provided a composition of a dielectric for a plasma display panel using the $P_2O_5$—ZnO—PbO glass that has the composition radios of 30~60 wt % of $P_2O_5$, 5~40 wt % of PbO, 0~5 wt % of MgO, 0~5 wt % of CaO, 0~10 wt % of $La_2O_3$, 0~5 wt % of SrO, 1~5 wt % of $Al_2O_3$ 0~2 wt % of $Sb_2O_3$, 0~2 wt % of $As_2O_3$, 5~25 wt % of BaO, and 0~5 wt % of $TeO_2$.

In order to achieve the above objects, there is also provided a composition of a dielectric for a plasma display panel using the $P_2O_5$—ZnO-PbO glass mixed with an oxide filler.

In order to achieve the above objects, there is also provided a composition of a dielectric for a plasma display panel using the $P_2O_5$—ZnO—PbO glass mixed with the oxide filler, of which the oxide filler refers to at least one of $PbTiO_3$, $Bi_2O_3$, $BaTiO_3$ $CaTiO_3$, $CaSnO_3$, $PbZrO_3$ and CaSiTiO.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
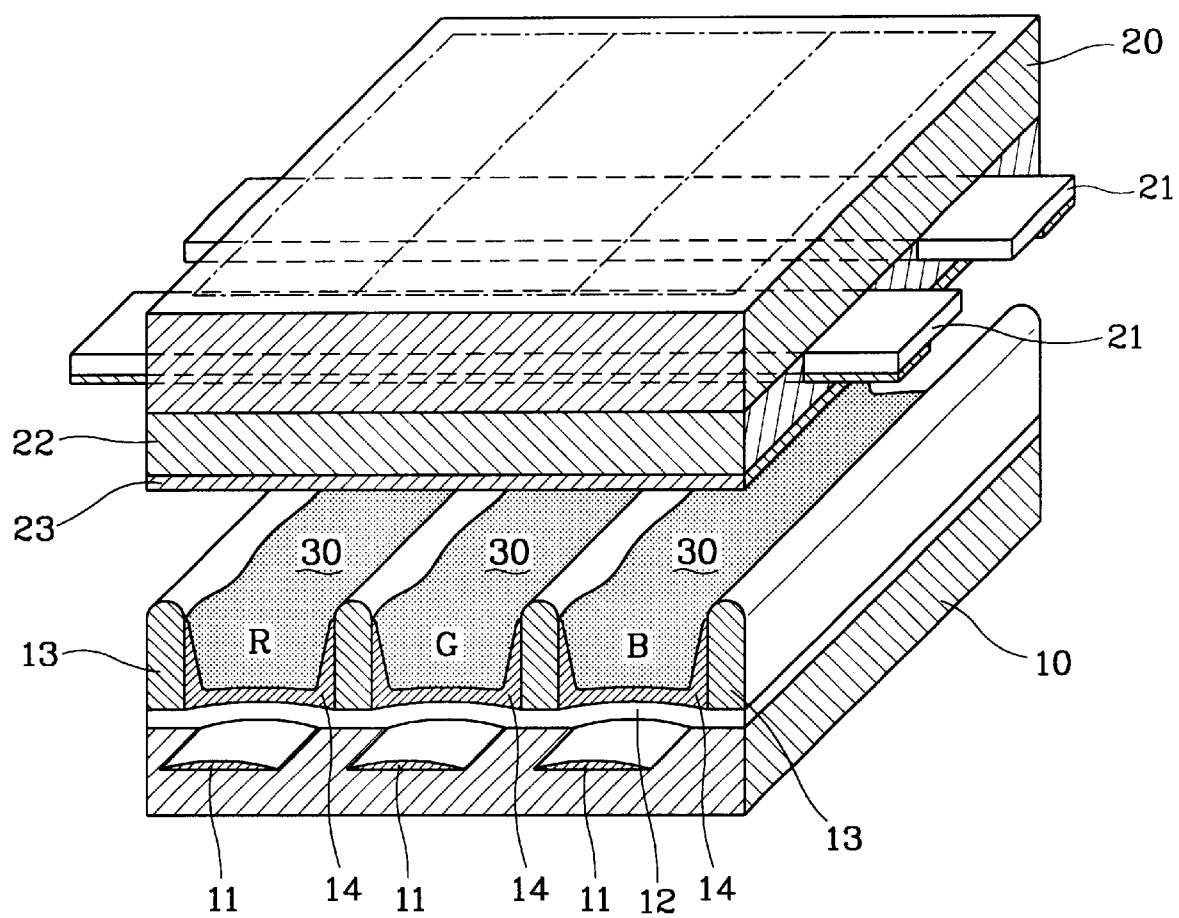
FIG. 1 is a schematic view showing a structure of a plasma display panel in accordance with a conventional art.

The composition of a dielectric for a plasma display panel use a $P_2O_5$—ZnO—PbO glass.

That is, the composition of a dielectric for a front substrate of the plasma display panel is formed with a $P_2O_5$—ZnO—PbO parents glass powder, or with a composition of mixture of the $P_2O_5$—ZnO—PbO parents glass powder and a filler powder.

The $P_2O_5$—ZnO—PbO parents glass powder contains 30~60 wt % of $P_2O_5$, 5~40 wt % of PbO, 0~5 wt % of MgO, 0~5 wt % of CaO, 0~10 wt % of $La_2O_3$, 0~5 wt % of SrO, 1~5 wt % of $Al_2O_3$, 0~2 wt % of $Sb_2O_3$, 0~wt % of $As_2O_3$, 5~25 wt % of BaO, and 0~5 wt % of $TeO_2$. The composition of a dielectric of the $P_2O_5$—ZnO—PbO glass powder contains less PbO than the composition of the conventional art, so that the weight of the dielectric thick film can be reduced.

As for the composition of a dielectric of the present invention, it is also preferred that the composition is obtained by a mixture of 5~50 wt % of oxide filler and 100 wt % of $P_2O_5$—ZnO—PbO glass powder.

Preferably, the oxide filler refers to at least one of $PbTiO_3$, $Bi_2O_3$, $BaTiO_3$, $CaTiO_3$, $CaSnO_3$, $PbZrO_3$ and CaSiTiO.

A method for fabricating a dielectric thick film using the above composition will now be described.

First, a raw material of the $P_2O_5$—ZnO—PbO parents glass or a raw material having a composition of a mixture of the raw material of the $P_2O_5$—ZnO—PbO parents glass and the oxide filler in the composition ratio of 100 wt %: 5~50 wt % is prepared. And then, the materials are mixed by a tumbling mixer that is driven for 10 hours.

Next, the mixed raw material is input to a melting furnace for melting. In this respect, the melting condition is preferably that it is melted for 1~5 hours at the temperature of 1200~1500° C., and it is desired to stir the raw material for two or three times so that it can be evenly melted during melding. In that manner, a melted glass having an even and fine organization can be obtained.

Thereafter, the melted glass is quickly cooled to thereby obtain a powder of fine particles. In other words, the melted copper is passed through a quenching roller and is quickly cooled, so that cutlets having a fine crack are generated. This cullets are milled for 16 hours by ball mill method and are sequentially passed through #170 and #270 sieve, thereby fabricating a powder has a fine particle size of approximately less than 10 $\mu$m.

Through the above process, the $P_2O_5$—ZnO—PbO parents glass powder is fabricated.

The $P_2O_5$—ZnO—PbO parents glass powder is mixed with a organic solvent in a certain ratio, to thereby fabricate a powder paste or a slurry.

The paste of the slurry is coated on the surface of the front substrate of the plasma display panel with a predetermined thickness and then sintered, thereby completing fabrication of the dielectric thick film of the front substrate.

At this time, the sintering temperature is typically determined by a crystallization temperature obtained from a differential thermal analysis of the parents glass powder. In case of the $P_2O_5$—ZnO—PbO parents glass powder of the present invention, it is preferably sintered for 15~30 minutes at the temperature of 580~590° C.

The dielectric thick film fabricated by the composition of a dielectric for a plasma display panel, that is, the $P_2O_5$—ZnO—PbO glass or the parents glass powder having the composition of the mixture of the $P_2O_5$—ZnO—PbO glass and the oxide filler in accordance with the present invention has the following characteristics. That is, its sintering temperature is approximately 550~560° C., its light transmissivity is 75~90% on the basis of a light of 400~800 nm, its dielectric constant is 7~35, its coefficient of thermal expansion is 60~85×$10^{-7}$/° C., and its withstand voltage is more than 1.5 kV.

As so far described, the composition of a dielectric for a plasma display panel of the present invention is advantageous in that the content of PbO is relatively low, compared to that of the conventional composition of a dielectric, so that the weight of the dielectric thick film is reduced.

In addition, the composition of a dielectric for a plasma display panel of the present invention has a relatively high dielectric constant, compared to that of the conventional composition of a dielectric, so that the discharge voltage can be lowered down.

Moreover, the composition of a dielectric for a plasma display panel of the present invention has the low sintering temperature, so that the glass substrate for the plasma display panel is prevented from deforming and damaging.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A composition of a dielectric layer for a plasma display panel wherein the composition of a dielectric comprises a $P_2O_5$—ZnO—PbO glass and an oxide filler comprising $PbTiO_3$, $Bi_2O_3$, $BaTiO_3$, $CaTiO_3$, $CaSnO_3$, $PbZrO_3$ or $CaSiTiO$.

2. The composition of the dielectric for a plasma display panel according to claim 1, wherein the dielectric layer comprises a front dielectric thick film formed to cover a front substrate.

3. The composition of the dielectric for a plasma display panel according to claim 1, wherein the $P_2O_5$—ZnO—PbO glass comprises 30~60 wt % of $P_2O_5$, 5~40 wt % of PbO, 0~5 wt % of MgO, 0~5 wt % of CaO, 0~10 wt % of $La_2O_3$, 0~5 wt % of SrO, 1~5 wt % of $Al_2O_3$, 0~2 wt % of $Sb_2O_3$, 0~2 wt % of $As_2O_3$, 5~25 wt % of BaO, 0~5 wt % of $TeO_2$ and ZnO.

4. The composition of a dielectric for a plasma display panel according to claim 1, wherein the oxide filler and the $P_2O_5$—ZnO—PbO glass have a ratio of about 95~50 wt %:5~50 wt %.

5. The composition of a dielectric for a plasma display panel according to claim 1, wherein the $P_2O_5$—ZnO—PbO glass comprises:

$P_2O_5$, PbO, ZnO and at least one of $La_2O_3$, SrO, $Sb_2O_3$ or $As_2O_3$.

* * * * *